(12) United States Patent
Wobben

(10) Patent No.: US 7,025,567 B2
(45) Date of Patent: Apr. 11, 2006

(54) EARLY-WARNING SYSTEM FOR WIND POWER INSTALLATIONS

(76) Inventor: Aloys Wobben, Argestrasse 19, Aurich (DE) 26607

( * ) Notice: Subject to any disclaimer, the term of this patent is extended or adjusted under 35 U.S.C. 154(b) by 99 days.

(21) Appl. No.: 10/769,547

(22) Filed: Jan. 30, 2004

(65) Prior Publication Data

US 2004/0258521 A1    Dec. 23, 2004

Related U.S. Application Data

(63) Continuation-in-part of application No. PCT/EP02/07043, filed on Jun. 26, 2002.

(30) Foreign Application Priority Data

Jul. 31, 2001    (DE) .................................. 101 37 272

(51) Int. Cl.
*F03D 11/00* (2006.01)

(52) U.S. Cl. .............................. 416/1; 416/40; 416/61; 415/118

(58) Field of Classification Search ...................... None
See application file for complete search history.

(56) References Cited

U.S. PATENT DOCUMENTS

| | | | |
|---|---|---|---|
| 4,651,017 A | 3/1987 | Longrigg | 290/44 |
| 5,979,234 A * | 11/1999 | Karlsen | 73/170.13 |
| 6,749,399 B1 * | 6/2004 | Heronemus | 416/41 |
| 2002/0067274 A1 * | 6/2002 | Haller | 340/601 |

FOREIGN PATENT DOCUMENTS

| | | |
|---|---|---|
| DE | 198 05 328 A1 | 8/1999 |
| DE | 100 33 183 A1 | 1/2002 |
| GB | 2 280 035 A | 1/1995 |
| WO | WO 96/18916 | 6/1996 |
| WO | WO 98/42980 | 10/1998 |

OTHER PUBLICATIONS

Antoniou, "ON the Theory of SODAR Measurement Techniques", Apr. 2003, Riso National Laboratory, abstract.*
Hardesty, R. et al., "Lidar Measurement of Turbulence Encountered by Horizontal-Axis Wind Turbines," *Journal of Atmospheric and Oceanic Technology*, American Meteorological Society, pp. 191-203, Mar. 1987.
Perry, T., "Tracking Weather's Flight Plan," *IEEE Spectrum online*, retrieved from http://www.rap.ucar.edu/general/press/ieeecoverstory.html, Sep. 2000.

* cited by examiner

*Primary Examiner*—Ninh H. Nguyen
(74) *Attorney, Agent, or Firm*—Seed IP Law Group PLLC

(57) ABSTRACT

The claimed and disclosed systems and methods are directed to providing measures and possible ways of protecting a wind power installation in a wind park from wind conditions that may potentially cause damage or even result in the failure of at least one of the wind power installations. The wind is monitored in at least one region of the wind park and based on the monitored wind readings; the rotor blades of at least some of the wind power installations may be adjusted to avoid detrimental damage thereto. This protection may be balanced with contemporaneously determining whether other, non-impacted wind installations can be contemporaneously operated at or near their maximum possible energy yield. At least one wind power installation may have a SODAR system mounted thereon to detect the wind in a region of the wind power installation.

15 Claims, 2 Drawing Sheets

EARLY-WARNING SYSTEM FOR WIND POWER INSTALLATIONS

CROSS-REFERENCE TO RELATED APPLICATION

This application is a continuation-in-part of International Application PCT/EPO2/07043, filed Jun. 26, 2002, which claims priority from German Application 101 37 272.8, filed Jul. 31, 2001.

BACKGROUND OF THE INVENTION

1. Field of the Invention

This invention relates to sensing rapid changes in wind conditions and modifying the wind power installation structure based on such changes and in one specific embodiment, it relates to transmitting those changes to multiple wind power installations based on information sensed at a different wind power installation.

2. Description of the Related Art

Depending on their respective size and power design wind power installations are relatively expensive capital investment items which are to be protected from ruin, damage or other causes which bring about failure of a wind power installation if the long service life promised for the wind power installation is to be attained. At the same time in relation to wind power installations there is always a wish to operate them at the maximum possible power output so that it is also possible to achieve an energy yield of maximum magnitude. Both aims, namely the long service life on the one hand and the highest possible energy yield on the other hand are in part in diametrically opposite relationship, but ultimately it would admittedly be basically possible for a wind power installation also to be operated partially in the overload range, whereby the energy yield thereof is increased, but at the same time this would also result in a marked curtailment in the service life. If in contrast a wind power installation is operated only in quite low wind speed ranges then the installation is certainly protected better than others, but it is inadequate from the point of view of its energy yield.

BRIEF SUMMARY OF THE INVENTION

One object of the invention is to provide measures and possible ways of protecting a wind power installation from damage or circumstances causing failure of a wind power installation, while however at the same time permitting high energy yield to be achieved.

That object is attained by means of an invention having the features set forth in claim 1 or claim 2. Advantageous developments are set forth in the appendant claims.

DETAILED DESCRIPTION OF THE INVENTION

Figure 1:
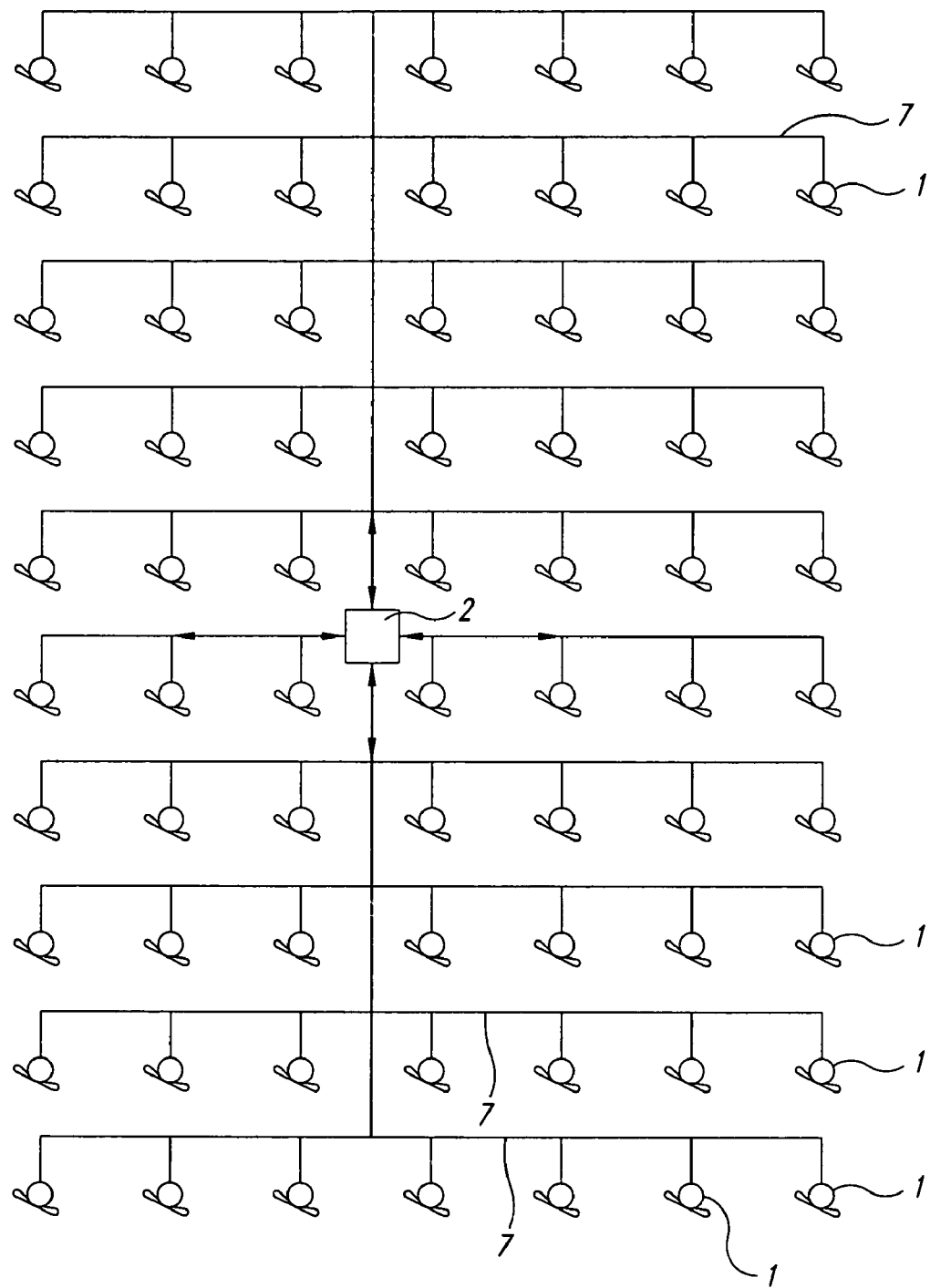
FIG. 1 is a schematic type view of a wind park having a plurality of wind power installations in which information is transmitted to and from a central location.

The invention is based on the realization of not just measuring, as hitherto done, the wind conditions at an individual wind power installation by means of anemometers or other sensors, but also using those measurement results for other wind power installations which in the direction of the wind are arranged behind the first wind power installation. If necessary, for example when a gust or squall occurs, the other wind power installations can implement a change in their blade setting angle at a moment which is still in good time before the gust or squall hits the wind power installation, and then, when the gust or squall hits the other wind power installations, the loading on them is not so great that it can still give rise to damage.

The early-warning system according to the invention permits use of two different approaches which however can also be combined together and which then supplement each other.

One approach involves mounting a so-called SODAR system (see for example http://aku100.physik.uni-oldenburg.de/Schallausbreitung/sodar1) to the wind power installation itself, preferably to the pod thereof, for example in the front hub region in front of the rotor. Such SODAR systems (Sonic Detection and Ranging) are capable of three-dimensional detection of the wind conditions (online) in a desired direction (in the direction of the wind) in front of the wind power installation. If therefore a SODAR system is mounted to a pod of the wind power installation and directed towards the region in front of the rotor of the wind power installation, there is no need for any subsequent adjustment (as the SODAR system is always oriented with the pod in the direction of the main wind direction) and can observe the region in front of the rotor of the wind power installation to ascertain whether gusts or squalls occur.

SODAR systems alone are previously basically known, but hitherto they have only been stationarily constructed or are transported in the form of mobile installations on a trailer and then only serve for one-off measurement of a wind profile in a given region.

In accordance with the invention such SODAR systems are placed in position at the wind power installation and are not just set up stationarily once, so that when a gust or squall approaches, which could result in unwanted overloading of the wind power installation, that is detected in good time and the rotor blades are suitably adjusted at a time which is still prior to the gust or squall hitting the wind power installation so that the loading that the gust or squall applies to the wind power installation is markedly less than with unadjusted rotor blades.

If the SODAR system is mounted to a wind power installation or to a plurality of wind power installations, which is erected in a wind park and if the wind power installation is erected in the edge region of the wind park, which the approaching wind hits first, the data measured by the SODAR system can not only be processed in the wind power installation which carries the SODAR system, but also by all further wind power installations which, in the direction of the wind, are behind the wind power installation equipped with the SODAR system, so that there too the gust or squall passing therethrough, or other detrimental wind conditions, cannot cause any damage if the wind power installations suitably set the rotor blades into the wind and thus they are unassailable for a squall or gust or other disadvantageous wind conditions.

In the case of wind parks however there is also a possible alternative form of an early-warning system insofar as the previous anemometers and loading measuring devices which are mounted to a wind power installation can be used to provide data which are important for the wind power installation which carries the anemometer or the loading measuring device, but are also put to use for the wind power installations in a wind direction behind the wind power installation with the anemometer. If for example the anemometer measures very high wind strengths then corresponding items of information can be delivered to the further installations which in the direction of the wind are behind the wind power installation involved, and those further wind power installations can then adjust the rotor blades in good time before the occurrence of the unwanted wind conditions which involve a dangerous loading. Further other steps can be taken, for example to completely shut down installations, that the loadings caused by the detrimental wind conditions and thus any damage which may possibly occur are as slight as possible and are preferably entirely avoided.

Setting of the rotor blades into the wind usually means that the surface area of the rotor blades, which is exposed to the wind, decreases, and under some circumstances that can also result in a reduction in the electrical power output. That disadvantage is accepted however if, with the avoidance of overloads, it is possible to avoid the damage which they entail, and ultimately even just a few overload situations can markedly reduce the service life of the entire installation so that a temporarily reduced level of power output is scarcely crucial if that is considered for the overall service life of the wind power installation.

The early-warning system according to the invention in which data for example, wind and loading data, which are measured at one wind power installation can also be used for other wind power installations includes a communications network between the wind power installations of a wind park, in which respect data transmission can be effected from one wind power installation to another wind power installation. This communication can be done wirelessly or also by a hard-wired system or other network technologies which are already known.

In this case data communication can be from one installation to another or alternatively also by way of a central control. If a central control, then the central control can in turn pass the items of information relating to the wind conditions which are measured at one installation, to all or selected wind power installations (for example those in the 'wind shadow' of a given installation) of a wind park and/or can in turn provide the required control signals and communicate them to the respective wind power installations. It will be appreciated that it is also possible to envisage a combination of SODAR and anemometer measuring detection procedures so that communication can be implemented on the one hand from one installation to another and on the other hand by way of a central control so that there is information redundancy, which for example permits error correction. Plausibility checking can also be effected for example in such a way that the control instruction from the central control for the wind power installation can be checked on the basis of the wind speed or wind direction data communicated from one installation to another and is implemented only when plausibility is established.

It will be appreciated on the other hand that it is also possible for each installation to effect a suitable control in its own control device on the basis of the data communicated between the installations and a central control arrangement performs a corresponding monitoring procedure.

As the distance between the individual wind power installations of a wind park is fixed when it is constructed, it is possible, on the basis of the known wind speed, when disadvantageous wind conditions occur, to calculate or to precalculate quite reliably when the correspondingly detrimental wind conditions, for example the gust or squall, reach which installation. Accordingly for example it is possible to calculate a wind speed-dependent lead time that the installation requires in order to implement the required adjustment, for example, the angle of attack of the rotor blades with respect to the wind. Alternatively or additionally it is possible to introduce a fixed component for the lead time.

By virtue of the distances between the individual wind power installations and the wind speeds the resulting prewarning times will usually suffice to change the blade angles in good time. A standard wind power installation has pitch speed change of between about 4 and 8°/second.

As mentioned, the operation of ascertaining the items of information relating to the wind conditions which are measured at a wind power installation can also be effected at all wind power installations of a wind park. It can then be collected at a central location and dated to control the individual wind power installations transmitted to the respective locations as appropriate. An alternative can be information communication which is dependent on wind direction, in which case it would then be possible to provide a spread angle in order to communicate the information at least to the installations which are directly beside the path of the wind. That angle can again be fixed or it can be selected in dependence on fluctuations in the direction of the wind.

It will be appreciated that, in the course of information communication, besides the pure wind speed and wind direction data, it is also possible to communicate further data such as identifications of transmitter and target wind power installations, error correction codes or similar items of information.

Giving particular consideration to the direction of the wind appears appropriate from the aspect that, with a substantially constant wind direction, local gusts always still occur, which may reach only a part of the wind power installations so that, from the point of view of optimizing yield, only those wind power installations which are actually in the way of such a gust also have to be suitably controlled so that the loading which occurs there turns out to be as low as possible, while the other wind power installations remain at full power operation.

FIG. 1 shows by way of example a wind park arrangement with a plurality of wind power installations 1 which are each connected by lines 7 to a central control 2. In this case the central control can suitably process measured data from individual installations and also provide suitable control signals for individual installations, based on the data collected at each wind power installation 1. For example, each wind power installation may have an individual anemometer, SODAR device or other wind power sensing device. For example, a loading sensor for the individual blades may be present or some other computer computer-controlled feedback mechanism that provides an indication of the loading present on the blades based on the angle of the blades with respect to the wind and as wind conditions change. This data is collected locally at each individual wind power installation 1 and then connected by line 7 to a central control 2 which then outputs the appropriate control to other wind power installations 1 within the wind park.

Figure 2:
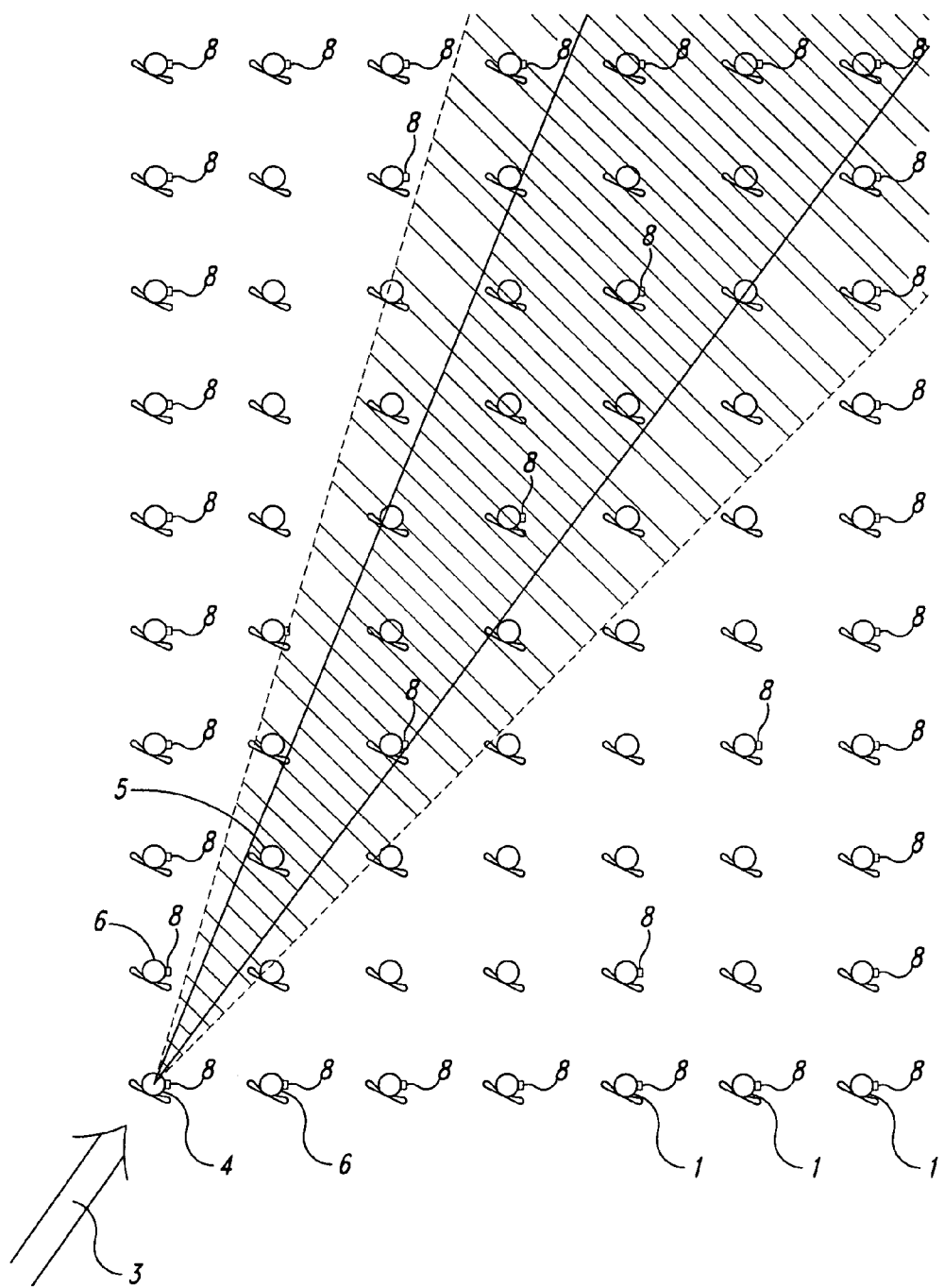
FIG. 2 is a schematic view of a second embodiment of a wind farm having a plurality of wind power installations in which information is transmitted between individual wind power installations regarding environmental conditions.

FIG. 2 shows by way of example a typical situation of use. In this case the wind 3 flows to a given installation 4 first, which in turn passes the measured data to a central control or in some other manner without use of a central control to other installations. It is to be expected that the wind which impinges against the installation will also hit the installations 5 which are arranged in the immediate wind shadow of the installation (narrow hatching). It is however quite possible for the spread angle also to be made wider (wider hatching) in order thereby to define a wider 'wind shadow' so that, at all installations which partly or completely fall into the hatched region, the measurement results of the first installation can therefore also be used to control the further installations 5 in the wind shadow of the first installation, in such a way that damage to the further installations 5 does not occur and they are therefore also protected by virtue of evaluation of the measurement results of the first installation.

As already described, instead of a central control 2, it is also possible to use another control concept. Thus for example that concept can also be such that there are data connections by radio or other network between adjacent installations or between wind power installations of a given region and in that way measurement data can also be exchanged wirelessly and without a central control between wind power installations.

It is also possible that, when a given wind situation arises, for example in the case of gusts, it is not only the installation that is specifically involved which is adjusted, but all installations in the immediate proximity of that installation or installations, which are in a given geographical relationship with the affected installation. That can be for example as shown in FIG. 2 also the wind power installations 6 which are to the right and to the left of the affected installation in the direction of the wind.

If the first installation 4 as shown in FIG. 2 is equipped with a SODAR, then, when the gust hits the first wind power installation, that gust can already be measured and suitable precautions can also be taken at the first wind power installation so as to avoid any damage.

According to one embodiment of the present invention, a data transmission and receive device is coupled to one or more of the individual wind power installations 1 within the wind park. The data transmit receive device 8 receives input data at its own local wind power installation 1 regarding the conditions of the wind, wind gusts and local loading. This data is then analyzed based on its direction, strength and other information. A signal is then transmitted to other wind power installations 1 which are going to be affected by the wind condition based on the analysis performed. For example, if the wind gust is shown to be in a particular direction having a first wind shadow that will effect particular wind installations 5 then the signal is transmitted in such a way that the particular wind installations 5 that will be affected by the wind condition are directly alerted. Such wind installations 5 can take preventive steps prior to the gust arriving such as feathering the blades, turning the hub to reduce the damaging effects of the wind, reducing the loading or other steps. The data transmitted can be in the form of coded signals which identifies the particular other wind power installations within the same wind park which are likely to receive the gust or take some other alternative form such as providing a direction and strength to the entire wind park and other wind power installations may calculate the likelihood of receiving the gust and then take appropriate action based on the relative location, direction and strength of the gust which such other wind power installations are likely to see so that some wind power installations may make minor modifications while others make major modifications in anticipation of the wind gust arriving. Other wind power installations 6 which are outside of the wind shadow may make no adjustments at all. This may be because they do not receive the signal since the wind power installation 4 which transmitted the signal identified in advance those wind power installations which were likely to receive the gust and transmit the information only to them. As an alternative embodiment, the signal can be transmitted to all wind power installations within the local region and the individual wind power installations, upon receiving the data from wind power installation 4 as well as other wind power installations 5 or others within the wind park can then determine the likelihood that they themselves will receive an unexpected gust and, based on this can make a determination at their own individual wind power installation whether or not an adjustment is needed and take the action which is deemed most appropriate based on the data which is collected from one or more other wind power installations in the wind park. Thus, some wind power installations, upon collecting data from multiple other wind power installations to make no modification while others may to make substantial modification in order to avoid damage from the gust.

In one embodiment, it is preferred that each wind power installation have its individual transmit and receive device 8 and each one be mounted with a SODAR system or some other sensor so that they may both transmit and receive information to the benefit of other wind power installations within the same wind park. As an alternative embodiment, it may only be necessary that the wind power installations at the corners or edges contain the sensing devices and that other wind power installations may contain only receivers in order to take corrective action but do not themselves contain sensors or transmit devices. Thus, the sensors transmit and receive devices 8 may be mounted on each wind power installation within the entire wind park, or alternatively on only a few of the wind power installations based on the relative position of each particular wind power installation within the overall wind park.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A wind power installation comprising a SODAR system which is mounted to the pod of the wind power installation and which detects the region in front of the rotor of the wind power installation.

2. The wind power installation according to claim 1 wherein the SODAR is preferably mounted in the region of the rotor hub of the wind power installation, preferably in front of the plane of the rotor of the wind power installation.

3. The wind power installation according to claim 1 characterized in that the SODAR measures the wind conditions in front of the rotor and transmits corresponding measurement data to a control of the wind power installation, which in turn, when particularly undesirable wind conditions occur, for example when gusts occur, suitably alters the angle of attack of the rotor blades, in order thereby to protect the entire installation from unwanted loadings and damage.

4. An early-warning system for protecting wind power installations in a wind park, comprising:
   means for measuring the wind conditions in the region of a first wind power installation, and means for processing the measured data are processed by a control device which controls the first wind power installation and/or another second wind power installation in the proximity of the wind power installation, wherein the control involves in particular adjustment of the angle of attack of the rotor blade with respect to the wind and adjustment of the angle of attack is effected as soon as a wind condition endangering the first wind power installation is measured.

5. The wind park comprising a plurality of wind power installations according to claim 4, wherein the measurement data of a first wind power installation of the wind park, which is first exposed to the wind, are transmitted to at least one second wind power installation which in the direction of the wind is behind the first wind power installation, and the second wind power installation in the wind shadow of the first wind power installation is controlled in dependence on the measured data about the wind condition in the region of the first wind power installation.

6. A method of controlling one or more wind power installations, the method comprising:
   anticipatorily detecting a wind condition that effects a first wind power installation; and
   controlling an angle of attack of at least one rotor blade of a second wind power installation, wherein controlling the angle depends on the detected wind condition.

7. The method according to claim 6 wherein anticipatorily detecting a wind condition includes detecting a spatial and/or temporal distribution of a gust of wind in a region near the first wind power installation.

8. The method according to claim 6 wherein anticipatorily detecting a wind condition includes detecting a wind speed with at least one device that is located on or near one or more wind power installations of a group of wind power installations.

9. The method according to claim 6 wherein controlling the angle of attack of the at least one rotor blade of the second wind power installation includes adjusting the angle of attack of the at least one rotor blade of the second wind power installation before the wind condition reaches the second wind power installation.

10. The method according to claim 6, further comprising:
   providing control instructions for the second wind power installation, wherein the control instructions are produced at one of either the first wind power installation or at a central control.

11. The method according to claim 6, further comprising:
   communicating information regarding the wind condition, the information communicated either wirelessly or through a line.

12. A wind power installation comprising a device for detecting the wind conditions in the region of the wind power installation characterized by a device for transmitting/receiving wind speed and/or wind direction information to/from at least one of the further wind power installations in the wind park.

13. A wind power installation comprising a device for detecting the wind conditions characterized in that the device for detecting the wind speed operates with sound waves, preferably with ultrasonic waves in the manner of a SODAR.

14. A wind power installation according to claim 13 characterized in that the device for detecting the wind speed is arranged at least in part in the region of the pod of the wind power installation.

15. A wind power installation according to claim 14 characterized in that the device for detecting the wind speed three-dimensionally detects the wind speed.

* * * * *